United States Patent
Wojahn

(10) Patent No.: US 9,274,895 B1
(45) Date of Patent: Mar. 1, 2016

(54) PROCESSING DEVICE WITH SELF-SCRUBBING LOGIC

(71) Applicant: Sandia Corporation, Albuquerque, NM (US)

(72) Inventor: Christopher K. Wojahn, Sante Fe, NM (US)

(73) Assignee: Sandia Corporation, Albuquerque, NM (US)

( * ) Notice: Subject to any disclaimer, the term of this patent is extended or adjusted under 35 U.S.C. 154(b) by 348 days.

(21) Appl. No.: 13/941,190

(22) Filed: Jul. 12, 2013

Related U.S. Application Data

(60) Provisional application No. 61/768,110, filed on Feb. 22, 2013.

(51) Int. Cl.
  *G06F 11/07* (2006.01)
  *G06F 11/14* (2006.01)
  *G06F 11/10* (2006.01)

(52) U.S. Cl.
  CPC .......... *G06F 11/1446* (2013.01); *G06F 11/106* (2013.01)

(58) Field of Classification Search
  CPC .. G06F 11/073; G06F 11/0793; G06F 11/106
  USPC ................................. 714/6.1, 6.11
  See application file for complete search history.

(56) References Cited

U.S. PATENT DOCUMENTS

| | | | |
|---|---|---|---|
| 2002/0084421 A1* | 7/2002 | Petrick | G01T 1/24 250/370.09 |
| 2003/0200405 A1* | 10/2003 | Willman | G06F 12/145 711/163 |
| 2006/0225142 A1* | 10/2006 | Moon | G06F 21/6218 726/34 |
| 2009/0043873 A1* | 2/2009 | Barsness | G06F 11/1438 709/223 |
| 2010/0269022 A1* | 10/2010 | Clark | G06F 9/3867 714/764 |
| 2013/0181809 A1* | 7/2013 | Lin | B64G 1/428 340/4.3 |

* cited by examiner

*Primary Examiner* — Chae Ko
(74) *Attorney, Agent, or Firm* — Blakely, Sokoloff, Taylor, Zafman LLP

(57) ABSTRACT

An apparatus includes a processing unit including a configuration memory and self-scrubber logic coupled to read the configuration memory to detect compromised data stored in the configuration memory. The apparatus also includes a watchdog unit external to the processing unit and coupled to the self-scrubber logic to detect a failure in the self-scrubber logic. The watchdog unit is coupled to the processing unit to selectively reset the processing unit in response to detecting the failure in the self-scrubber logic. The apparatus also includes an external memory external to the processing unit and coupled to send configuration data to the configuration memory in response to a data feed signal outputted by the self-scrubber logic.

13 Claims, 4 Drawing Sheets

PROCESSING DEVICE WITH SELF-SCRUBBING LOGIC

CROSS-REFERENCE TO RELATED APPLICATIONS

This application claims the benefit of the earlier filing date of U.S. Provisional Patent Application No. 61/768,110, filed Feb. 22, 2013 and incorporated herein by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to processing devices, and in particular but not exclusively, relates to processing devices used in aerospace applications.

BACKGROUND INFORMATION

Aerospace and space-based projects often require high reliability electronics. However, electronic components are trending toward lower voltage and semi-conductor dies that have a narrower pitch in order to meet space constraints and power consumption metrics that consumer electronics demand. In aerospace and space-based application, electronic components are susceptible to radiation from energetic particles that are not absorbed by earth's atmosphere. Problematically, the lower voltage and smaller semiconductor dies produced make it more likely that an energetic particle will interrupt an electronic device upon impact. This phenomenon may cause a single-event upset ("SEU") or a single-event latchup that generates erroneous processing results. When a device memory is affected by radiation, it may be referred to as a "flipped bit."

To mitigate the radiation environment that electronic components are placed in, some parts are radiation hardened by design ("RHBD"). This may include insulating the semiconductor die with a physical layer (e.g. lead) or designing the electronic component with technologies that are less likely to be affected by radiation. Yet, even with RHBD electronic components, memory upsets may still occur.

As an alternative or in addition to using RHBD components, some designers try to mitigate radiation-generated upsets by using system architectures that include redundancy or error-checking capability. However, current redundant systems may require additional electronic components that add cost, area, and weight to the system and error-checking schemes may also require additional electronic components to carry out the error-checking scheme.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for correcting upsets in a processing device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
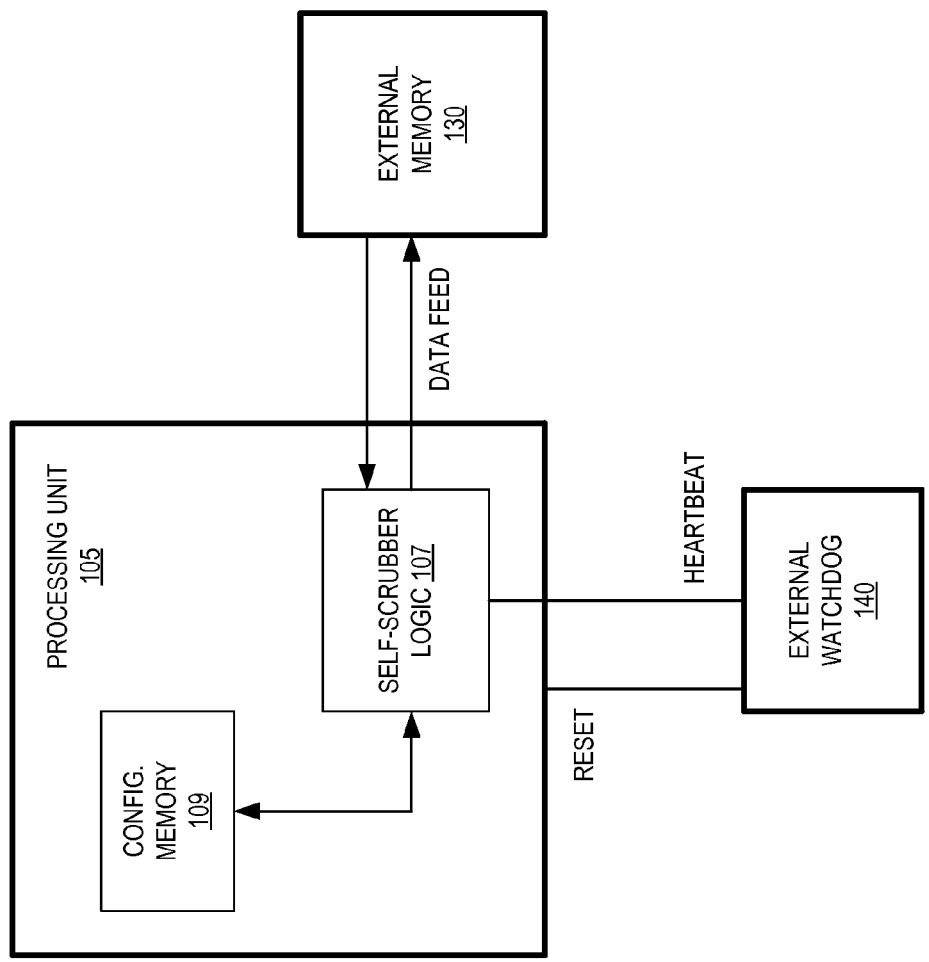
FIG. 1 illustrates an example processing system that includes a processing unit that includes self-scrubbing logic coupled to an external watchdog and an external memory, in accordance with an embodiment of the disclosure.

FIG. 1 illustrates an example processing system 100 that includes a processing unit 105 that includes self-scrubbing logic 107 and configuration memory 109, in accordance with an embodiment of the disclosure. Processing unit 105 may be implemented with a microprocessor, a field-programmable-gate-array ("FPGA"), or otherwise. In the illustrated embodiment, a watchdog unit 140 is external to processing unit 105 and the watchdog unit is coupled to self-scrubber logic 107 to detect a failure in self-scrubber logic 107. Watchdog unit 140 is also coupled to processing unit 105 to selectively reset the processing unit 105 in response to detecting a failure in self-scrubber logic 107.

Self-scrubber logic 107 may send a heartbeat signal to external watchdog unit 140 to indicate that self-scrubber logic 107 is operating properly and has not failed. In one embodiment, the heartbeat signal is a pulse that is sent within a pre-determined time period. In that case, watchdog unit 140 may reset processing device 105 if it does not receive the heartbeat signal from self-scrubber logic 107 within the pre-determined time period. Watchdog unit 140 may reset processing unit 105 by toggling a pin of processing unit 105 or setting a pin of the processing unit 105 to a specific logic level for a specific amount of time. In one embodiment, external watchdog unit 140 is implemented with a counter or timer. When the counter or timer reaches a certain count, external watchdog unit 140 may reset processing unit 105. The heartbeat signal sent by self-scrubber logic 107 may reset the counter or timer so that it does not reach the certain count—thereby preventing the resetting of processing unit 105. If the heartbeat signal is not received by external watchdog unit 140, it may indicate that self-scrubber logic 107 has failed and resetting processing unit 105 may be necessary to correct operation of self-scrubber logic 107.

Also in the illustrated embodiment, processing unit 105 is coupled to send a data feed signal to an external memory 130. External memory 140 is coupled to send configuration data to the configuration memory. In the illustrated embodiment, external memory 140 is coupled to send configuration data to configuration memory 109 via self-scrubber logic 107. In response to receiving the data feed signal from self-scrubber logic 107, external memory may send the configuration data to configuration memory 109. In one embodiment, external memory 130 is configured to load a bitfile into configuration memory 109 in response to the data feed signal, as a way to configure processing device 105. External memory 130 may be also be configured to load the bitfile into configuration memory 109 upon starting up the processing device 105. External memory 130 may be RHBD non-volatile memory. In one embodiment, configuration memory 109 is FLASH memory. In one embodiment, configuration memory 109 is non-volatile memory.

In FIG. 1, self-scrubber logic 107 is coupled to read configuration memory 109 to detect compromised data stored in the configuration memory. Radiation (e.g. energized particles) may impact configuration memory 109 and cause one or more flipped data bits that compromise the data stored in configuration memory 109. Self-scrubber logic 107 may be configured to access configuration memory 109 using specialized internal configuration interfaces of processing unit 105. In some embodiments, self-scrubber logic 107 utilizes error checking algorithms that are built-in or "native" to processing unit 105. A cyclical redundancy check ("CRC") may be one example of an error checking algorithm that may be utilized by self-scrubber logic 107.

Figure 2:
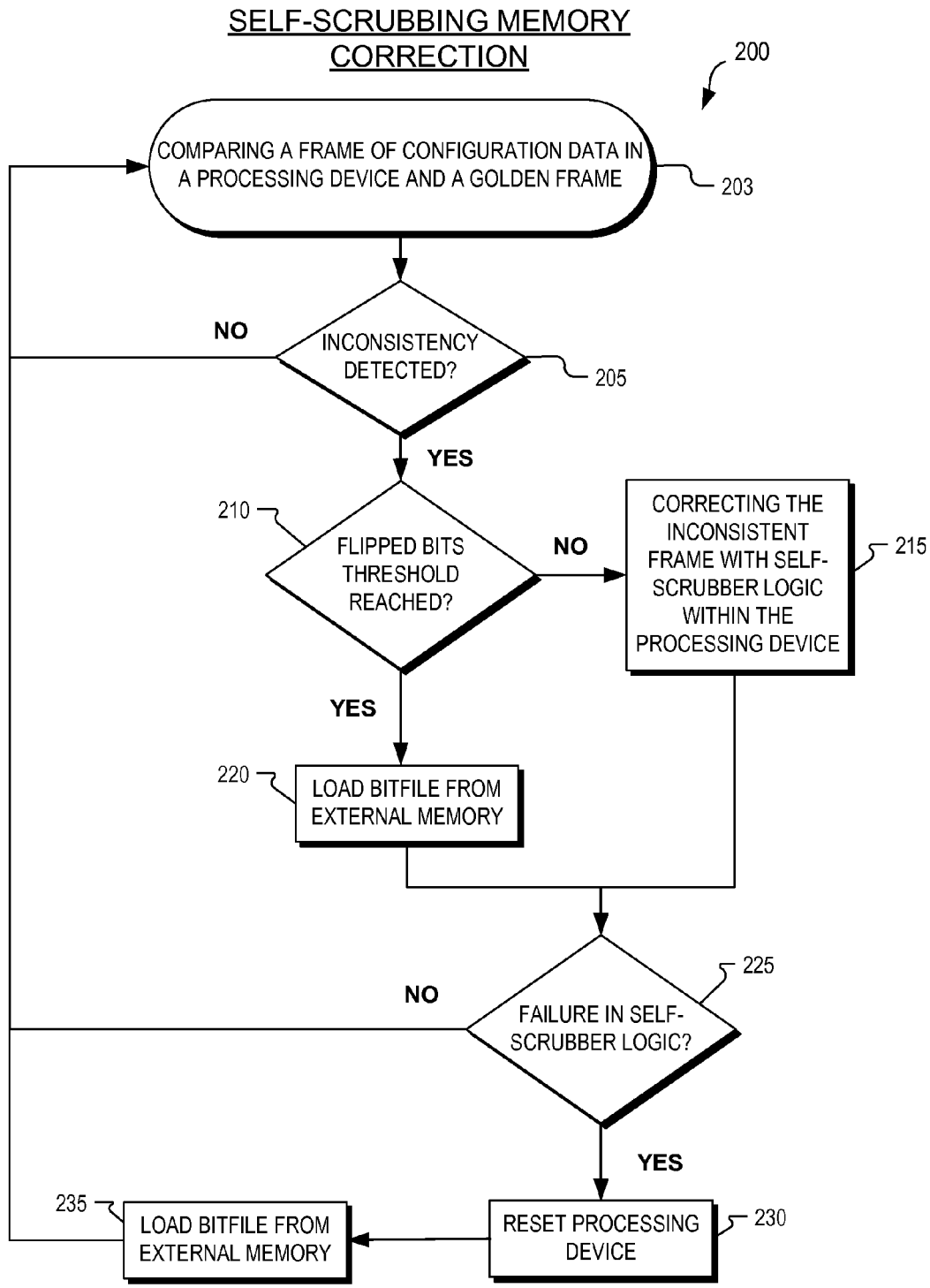
FIG. 2 illustrates a flow chart of an example process for correcting a memory inconsistency in a processing device using self-scrubbing logic within the processing device, in accordance with an embodiment of the disclosure.

FIG. 2 illustrates a flow chart of an example process 200 for correcting a memory inconsistency in a processing device using self-scrubbing logic within the processing device, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In process block 203, configuration data in a processing device is compared to "golden" data. The configuration data may have originally been an exact replica of the "golden" data. The golden data may be stored in external memory 130, for example. The configuration data is compared to golden data until an inconsistency is detected (process block 205). If no inconsistency is detected, process 200 continues comparing the configuration data with the golden data.

If an inconsistency is detected (process block 205), process 200 proceeds to process block 210. The inconsistency may be between a frame of configuration data stored in configuration memory 109 and a golden frame associated with the frame of configuration data. The inconsistency may be one or more flipped bits in a frame of the configuration data which may have been caused by radiation. In one embodiment, a CRC operation may operate in the background of the processing device to detect the inconsistencies by cycling through frames of configuration data and comparing the frames of the configuration data to the frames of golden data from which the given frame of the configuration data was copied.

Once an inconsistency is detected, the inconsistency is corrected based on a threshold level of flipped bits in a particular segment (e.g. a frame) of the configuration data. In process block 210, if the number of flipped bits in the particular segment is less than the given threshold, the process moves to process block 215. If the number of flipped bits in the particular segment meets a given threshold, the process moves to process block 220. In one example, the threshold level of flipped bits is two flipped bits.

In process block 215, the flipped bits are corrected by self-scrubbing logic (e.g. self-scrubber logic 107) internal to the processing device (e.g. processing unit 105). The self-scrubber logic may simply facilitate rewriting the flipped bit(s) in configuration memory to their correct logic levels.

In process block 220, the configuration data in the configuration memory is rewritten. In one embodiment, self-scrubber logic 107 sends a data feed signal to external memory 130. In response to receiving the data feed signal from self-scrubber logic 107, external memory 130 loads a bitfile into configuration memory 109 to overwrite the configuration data memory.

After process blocks 215 and 220, process 200 continues to process block 225 where the self-scrubber logic is monitored to detect a failure in the self-scrubber logic. Since it is possible that the self-scrubber logic also be upset by radiation, it is advisable to independently monitor the self-scrubber logic within the processing device.

If a failure within the self-scrubber logic is detected, process 200 continues to process block 230. The processing device (e.g. processing unit 105) is reset in process block 230. External watchdog 140 is one example of a logic circuit that could be utilized to detect a failure within self-scrubber logic 107 and reset processing unit 105. Optionally, in process block 235, a bitfile is loaded from an external memory (e.g. external memory 130) as part of the processing device's startup process, subsequent to being reset. Referring back to process block 225, if no failure within the self-scrubber logic is detected, process 200 returns to process block 203 where process 200 will continue comparing configuration data to golden data.

Advantageously, the system and process described in association with FIGS. 1 and 2 offer appreciable benefits over prior solutions. In a previous solution, a first processing device checked to make sure a second processing device was operating correctly and had not been upset. In the disclosed embodiments, having self-scrubber logic 107 internal to processing unit 105 eliminates the need for a second processing device (e.g. an FPGA) possibly paired with a second external memory to perform error checking on processing unit 105. This offers a cost, power, and weight savings. Self-scrubber logic 107 may be implemented within a processing device using relatively low overhead in terms of processing resources. Even though FIG. 1 includes the addition component of external watchdog unit 140, watchdog unit 140 may be implemented using much simpler and cheaper parts (e.g. a simple counter) than using a more expensive second processing device such as a microcontroller or FPGA.

Figure 3:
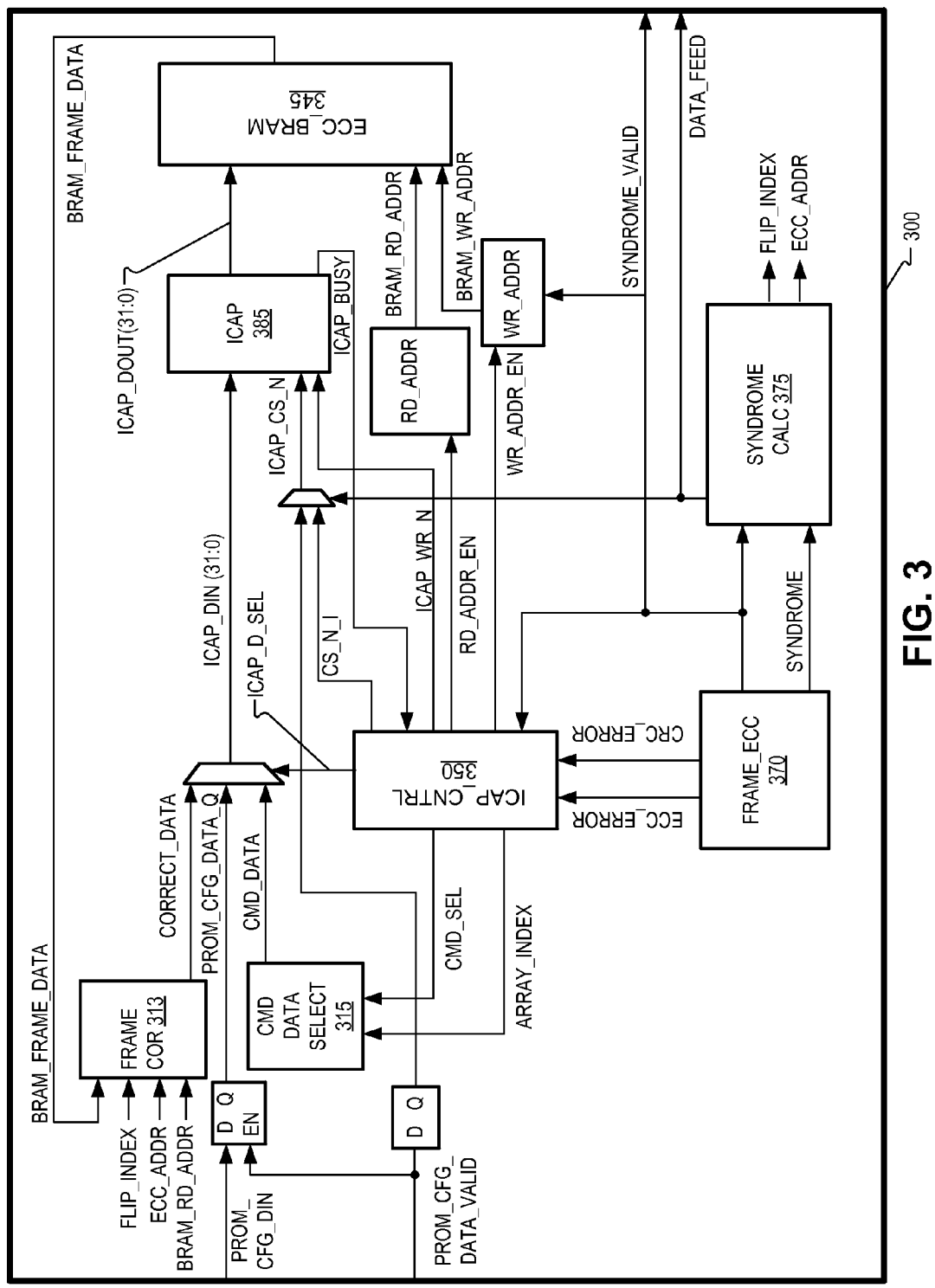
FIG. 3 illustrates an example field programmable gate array ("FPGA") that includes configuration memory and self-scrubbing logic, in accordance with an embodiment of the disclosure.

FIG. 3 illustrates an example FPGA 300, in accordance with an embodiment of the disclosure. FPGA 300 is one example of processing unit 105. In one example, FPGA 300 is a Xilinx Virtex-5QV. FPGA 300 includes a frame data correction module 313, a command data select module 315, an ICAP_CNTRL module 350, a frame_ecc module 370, a syndrome calculator module 375, an ICAP module 385, and an ECC_BRAM 345. It is appreciated that FPGAs have a limited amount of logic resources and the logic modules shown in FIG. 3 may include utilizing these logic resources. It is also appreciated that the functionality of these modules may be written into VHSIC hardware description language ("VHDL") code for HDL designs that generate FPGA firmware.

ICAP module 385 is an access port to the configuration memory of FPGA 300 and ICAP_CNTRL module 350 controls access to ICAP module 385. In the illustrated embodiment, ICAP module 385 is a 32-bit module using a 32-bit data bus. ICAP_CNTRL 350 may sit idle until a readback_CRC logic finds an error in the configuration memory of FPGA 300. ICAP_CNTRL module 350 is configured for writing commands to the configuration controller and controlling the timing of read and writes to ICAP module 385. Additionally, ICAP_CNTRL module 350 controls reading and writing of ECC_BRAM 345.

Frame_ecc module 370 may be a "primitive" of FPGA 300. Frame_ecc 370 is configured to perform continuous readback of the configuration memory of FPGA 300. Frame_ecc 370 may include the readback_CRC logic that runs in the background until an error in the configuration memory is detected. Readback_CRC may facilitate comparing the configuration memory with "golden" data as a way to detect errors in the configuration memory. When an error is detected, an error correcting code ("ECC") error may be registered. Additionally, a "syndrome" is registered to indicate which word in a frame has the error and which bit(s) in the word is/are flipped. If it is a single error correct (a single bit is flipped), the syndrome may be set to indicate a single error. If the error is a double error (two bits are flipped), the syndrome may be set to indicate a double error. Frame ecc module 370 may report the syndrome to syndrome calculator module 375.

Frame_ecc module 370 may output a syndrome_valid signal. The syndrome_valid signal may be a high logic pulse that is outputted after a pre-determined number of clock signals of FPGA 300. In one embodiment, a high logic pulse is outputted as the syndrome_valid signal every forty-one clock signals. The syndrome_valid signal may be received by an external watchdog unit (e.g. external watchdog unit 140) as indication that self-scrubber logic within FPGA 300 is operational. Frame data correction module 313, command data select module 315, ICAP_CNTRL module 350, frame_ecc module 370, syndrome calculator module 375, ICAP module 385, and ECC_BRAM 345 may be considered part of, or at least helping to facilitate the self-scrubber logic of FPGA 300. In one embodiment, adding self-scrubbing functionality to FPGA 300 uses less than one percent of the available logic resources of FPGA 300.

When syndrome_valid is asserted, syndrome calculator module 375 determines where the error is located based on the syndrome. If the syndrome indicates a single error correct, syndrome calculator module 375 facilitates rewriting the word in the frame (e.g. flipping the inconsistent bit) that includes the error. In the illustrated embodiment, syndrome calculator module 375 outputs a flip_index and an ecc_addr to facilitate rewriting the correct memory address of the frame that includes the erroneous data. The flip_index and ecc_addr may specify which word and which bit to flip in the erroneous frame. If the syndrome indicates a double error correct, syndrome calculator module 375 sends a data feed signal to an external memory (e.g. external memory 130) to cause the external memory to send configuration data to the configuration memory of FPGA 300. In the illustrated embodiment, the configuration data is received via the prom_cfg_din signal path. The illustrated prom_cfg_data_valid line may need to be enabled to enable writing the configuration data to the configuration memory.

In the illustrated embodiment, ECC_BRAM 345 is memory (not hardened) included in FPGA 300. ECC_BRAM 345 may be used to correct frames within configuration memory of FPGA 300. Since ECC_BRAM 345 is not hardened memory, it may be best practice to use it for relatively short time periods to limit possible error accumulation. In one embodiment, ECC_BRAM 345 can store forty-one words of data. To correct a frame of configuration memory, frame data correction module 313 may receive frame data from ECC_BRAM 345 and facilitate writing that frame data to the correct location in the configuration memory of FPGA 300. In FIG. 3, frame data correction module 313 receives flip_index and ecc_addr so that frame data correction module 313 can write the frame data to the correct word and/or bit within the configuration memory. More specifically, frame data correction module 313 may allow bram_frame_data to pass until bram_rd_addr equals ecc_addr and then it will flip the bit designated by flip_index.

Configuration commands are stored as arrays of constants and ICAP_CNTRL 350 selects the arrays and indexes using the cmd_sel and array_index lines coupled between command data select module 315 and ICAP_CNTRL 350. The configuration commands may include reading an error frame address register ("EFAR"), reading a frame, and writing a frame.

Figure 4:
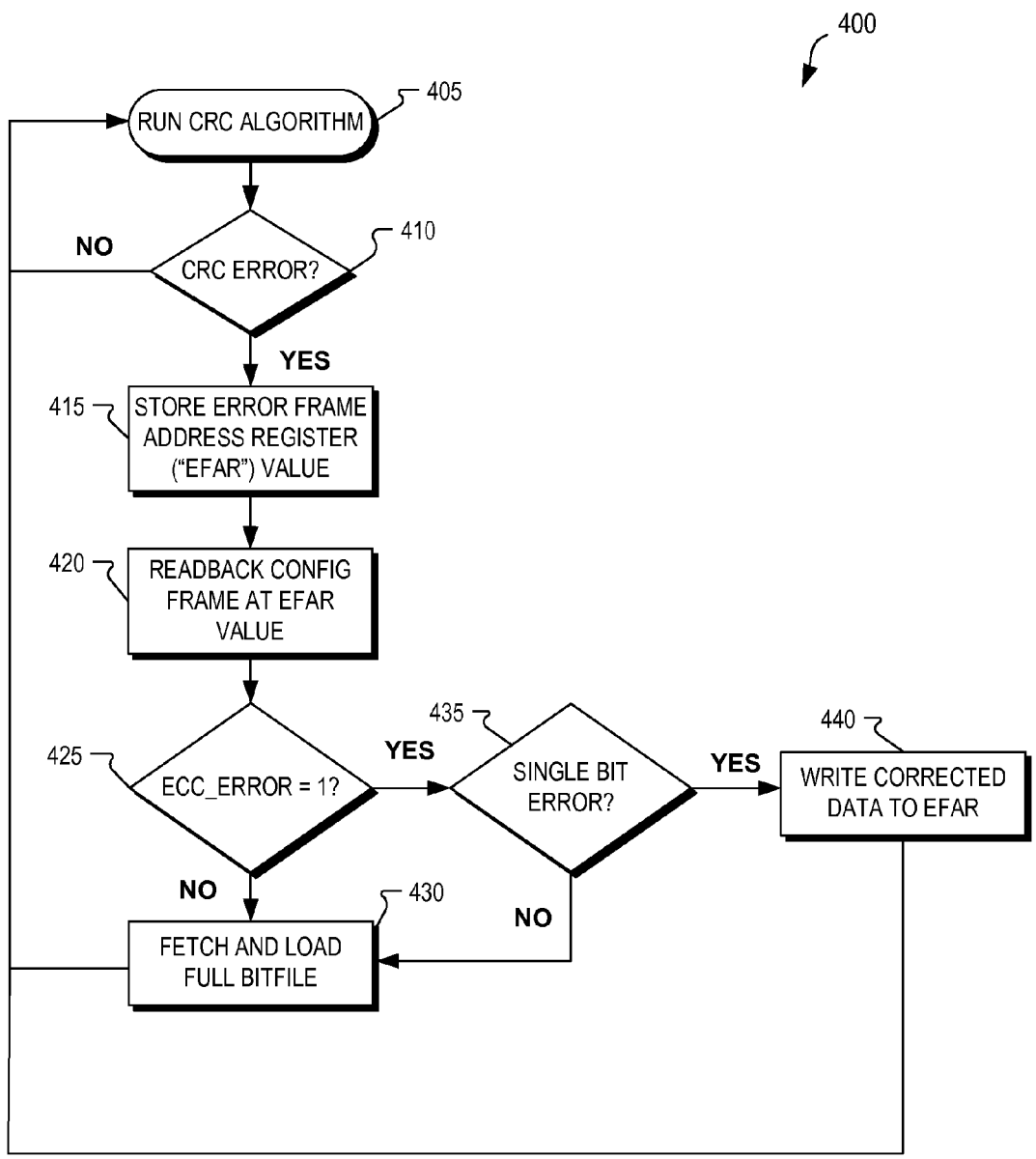
FIG. 4 illustrates a flow chart of an example process for correcting a configuration memory in an FPGA, in accordance with an embodiment of the disclosure.

FIG. 4 illustrates a flow chart of an example process 400 for correcting a configuration memory in an FPGA (e.g. FPGA 300), in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, a CRC algorithm operates to check for errors in a configuration memory of an FPGA. If there is no CRC error (process block 410), the CRC algorithm continues to operate. If there is a CRC error (process block 410), the CRC algorithm is paused and process 400 proceeds to process block 415. In process block 415, an error frame address register ("EFAR") value is stored. Then, the configuration frame at the EFAR value location is read back in process block 420.

In process block 425, the ECC_error is evaluated. If ECC_error is zero (indicating no error) process 400 proceeds to process block 430 because there are more than two errors and the errors can't be corrected using the syndrome. In process block 430, a full bitfile is fetched and loaded into then configuration memory of the FPGA. Fetching the bitfile may include sending commands to an external memory (e.g. external memory 130) that stores the bitfile to send the bitfile to the FPGA. After the bitfile is loaded into the configuration memory of the FPGA, process 400 returns to process block 405 for CRC checking.

If the ECC_error bit is set to one, indicating an error, process 400 proceeds to process block 435 to use the syndrome to determining if the error can be corrected and where the error is located within the configuration frame. If the syndrome indicates there is more than a single bit error (e.g. double bit error), the full bitfile is fetched to load into the configuration memory of the FPGA, in process block 430. If the syndrome indicates there is a single bit error, the correct value is written to the frame to correct the single bit error, in process block 440. After process block 440, process 400 returns to process block 405 for CRC checking.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware.

A tangible non-transitory machine-readable storage medium includes any mechanism that provides (i.e., stores)

information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus comprising:
    a processing unit including:
        configuration memory; and
        self-scrubber logic coupled to read the configuration memory to detect compromised data stored in the configuration memory;
    a watchdog unit external to the processing unit and coupled to the self-scrubber logic to detect a failure in the self-scrubber logic, wherein the watchdog unit is coupled to the processing unit to selectively reset the processing unit in response to detecting the failure in the self-scrubber logic; and
    an external memory external to the processing unit and coupled to send configuration data to the configuration memory in response to a data feed signal outputted by the self-scrubber logic.

2. The apparatus of claim 1, wherein, in response to detecting compromised data in the configuration memory, the self-scrubber logic is coupled to rewrite substantially all of the configuration memory when the compromised data includes a threshold level of flipped bits and coupled to correct a targeted portion of the configuration memory when the compromised data includes less than the threshold level of flipped bits.

3. The apparatus of claim 2, wherein the self-scrubber logic is coupled to output the data feed signal to the external memory when the compromised data includes the threshold level of flipped bits, and wherein the external memory is coupled to load a bitfile into the configuration memory in response to receiving the data feed signal from the self-scrubber logic.

4. The apparatus of claim 2, wherein the targeted portion of the configuration memory is a frame, and wherein the self-scrubber logic is coupled to write over the frame with a golden frame when the frame includes less than the threshold level of flipped bits, the frame once containing the same data as the golden frame.

5. The apparatus of claim 4, wherein the golden frame is stored in the external memory.

6. The apparatus of claim 2, wherein the targeted portion of the configuration memory is one bit within a frame, and wherein self-scrubber logic is coupled to flip the bit when the frame includes less than the threshold level of flipped bits, the threshold level of flipped bits being two flipped bits within a given frame of memory.

7. The apparatus of claim 2, wherein the threshold level of flipped bits is two flipped bits in a frame of compromised data of the configuration memory.

8. The apparatus of claim 1, wherein the self-scrubber is coupled to cycle through frames of the configuration memory frame-by-frame by calculating a syndrome for each frame, wherein the syndrome is calculated to be zero when no error exists in the frame.

9. The apparatus of claim 1, wherein the self-scrubber logic is coupled to periodically output a heartbeat pulse to the watchdog unit to indicate the self-scrubber logic has not failed, and wherein the watchdog unit is coupled to the processing unit to selectively reset the processing unit in response to not receiving the heartbeat signal during a pre-determined period of time.

10. The apparatus of claim 9, wherein the watchdog unit includes a timer coupled to be reset by the heartbeat pulse, and wherein watchdog unit is coupled to reset the processing unit when the timer reaches a pre-determined count associated with the pre-determined period of time.

11. The apparatus of claim 1, wherein the external memory is radiation hardened by design ("RHBD") non-volatile memory.

12. The apparatus of claim 1, wherein the processing unit is a reprogrammable field-programmable-gate-array ("FPGA").

13. The apparatus of claim 1, wherein the configuration memory includes FLASH memory.

* * * * *